Figure 1:
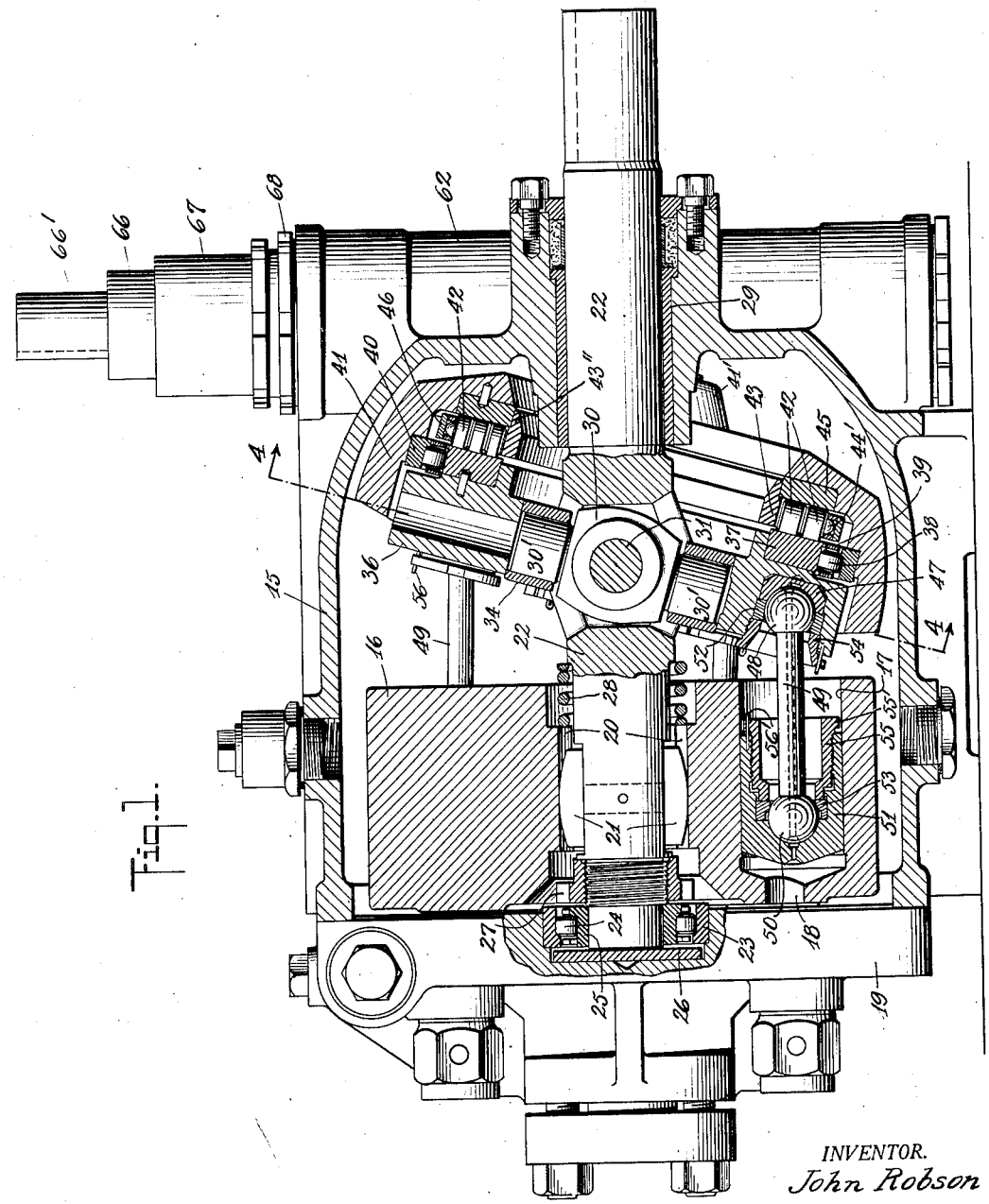

Feb. 14, 1928.

J. ROBSON 1,659,374

FLUID PRESSURE DEVICE

Filed May 5, 1923

3 Sheets-Sheet 1

INVENTOR.
John Robson
BY Lotka, Kehlenbeck & Mathé
ATTORNEYS.

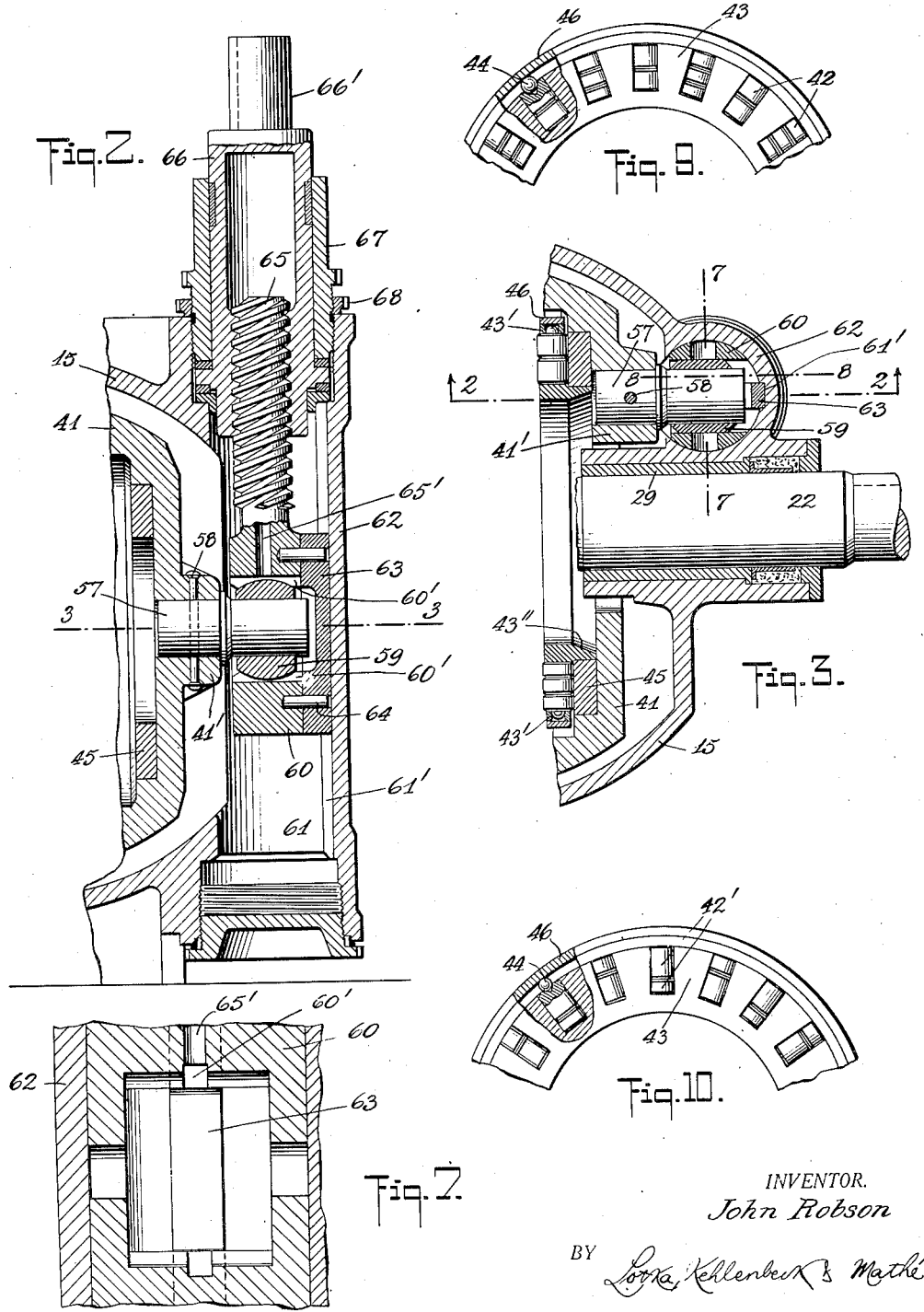

Feb. 14, 1928.

J. ROBSON 1,659,374

FLUID PRESSURE DEVICE

Filed May 5, 1923    3 Sheets-Sheet 3

INVENTOR.
John Robson
BY
*Lotka, Kehlenbeck & Mathé*
ATTORNEYS.

Patented Feb. 14, 1928.

1,659,374

UNITED STATES PATENT OFFICE.

JOHN ROBSON, OF WATERBURY, CONNECTICUT, ASSIGNOR, BY MESNE ASSIGNMENTS, TO THE WATERBURY TOOL COMPANY, OF WATERBURY, CONNECTICUT, A CORPORATION OF CONNECTICUT.

FLUID-PRESSURE DEVICE.

Application filed May 5, 1923. Serial No. 636,852.

My present invention relates to fluid-pressure devices, especially of the rotary type, and is applicable both to pumps, that is to say, devices which propel a fluid under pressure, and to motors adapted to be operated by a fluid under pressure. The embodiments of my invention illustrated in the drawings of the present application have been designed as improvements in the construction of pumps and motors of a certain type as disclosed in various patents owned by The Waterbury Tool Company, of Waterbury, Connecticut; as an instance of such patents, I may name the one granted to Harvey D. Williams on June 15, 1909, under No. 925,148. The object of my present invention is to improve devices of the above-indicated class in several ways, so as to simplify their construction and thus reduce their cost, to obtain joints of more efficient character, enabling me to use a higher oil pressure than hitherto for the oil which is generally used as the medium propelled by the pump, or actuating the motor, to improve the bearings, universal joint, and adjusting mechanism of the pump or motor, and in general to obtain a construction cheaper and easier to manufacture than the ones devised hitherto, while at the same time securing various advantages in operation, as will appear from the description following hereinafter.

The accompanying drawings exemplify how my invention may be carried out, but it will be understood that I do not wish to restrict myself to the exact arrangements shown.

Figure 4:
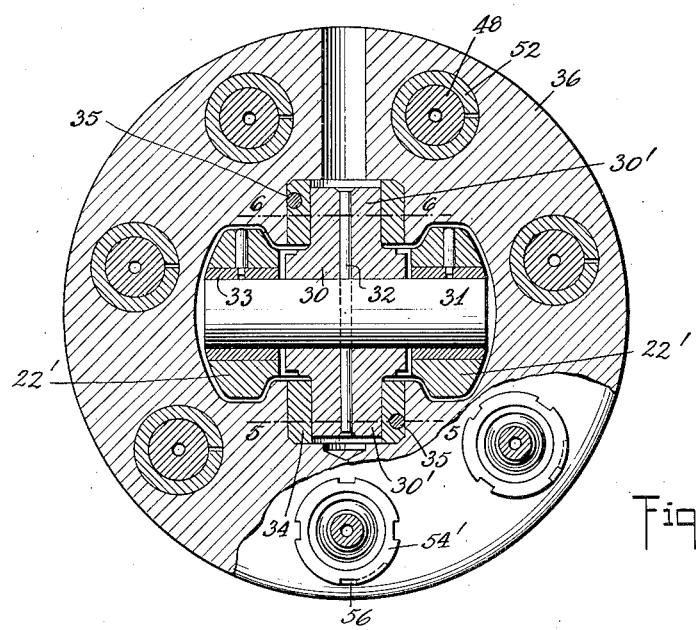
Figure 5:
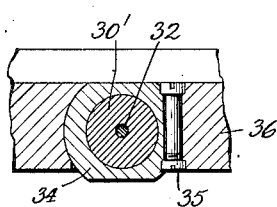
Figure 6:
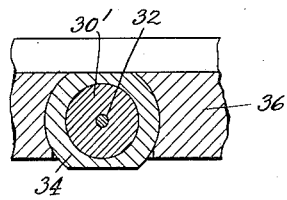
Figure 8:
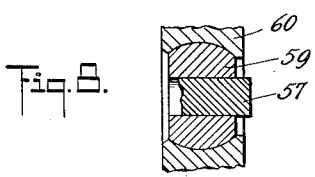

In said drawings, Fig. 1 is a longitudinal vertical section of a rotary device embodying my invention; said device of Fig. 1 would generally be used as a pump, although it is also adapted for use as a motor; Fig. 2 is a vertical section showing chiefly the adjusting mechanism, said section being taken on line 2—2 of Fig. 3, and the latter figure being a horizontal section on line 3—3 of Fig. 2; Fig. 4 is a section on line 4—4 of Fig. 1; Figs. 5 and 6 are sections on lines 5—5 and 6—6 respectively of Fig. 4; Figs. 7 and 8 are sections on lines 7—7 and 8—8 respectively of Fig. 3 (certain parts being omitted from 7); Fig. 9 is a face view of a portion of a roller bearing construction employed in this invention, with parts broken away, and others in section; and Fig. 10 is a view similar to Fig. 9, but showing a slightly different construction of this roller bearing.

In Fig. 1, I have shown a casing 15 containing the operative parts of the pump or motor, among them the rotary barrel 16 provided with cylinders 17, the reduced ports 18 of which register alternately, during the rotation of said barrel, with two ports (not shown) in the end plate 19, the oil or other fluid employed entering the cylinders 17 through one of the ports of said end plate, and leaving such cylinders through the other port of the end plate, all in the same general manner as set forth in prior patents relating to machines of this type. The barrel 16 is shown as provided with longitudinal keyways 20 into which extend keys 21 secured to the shaft 22, the outer surfaces of said keys being longitudinally convex, so as to allow the barrel to rock slightly, to permit it to adjust itself for good contact with the ported inner surface of said end plate 19. The keys 21 are fitted against flattened portions or surfaces of the shaft 22. In a recess on the inner surface of the end plate is seated a ring 23 forming a race for bearing rollers 24 which also engage a ring 25 mounted on the reduced end portion of the shaft. The rings 23, 25 with the rollers 24 are confined between a plate or washer 26 and a threaded sleeve 27 screwed on a corresponding portion of the shaft. The barrel 16 is pressed against the end plate 19 by a coiled spring 28 bearing against a suitable shoulder on said shaft.

At its other end, the shaft 22 is journaled in a suitable bearing 29 and the shaft portion projecting from this bearing is intended for connection with a driving mechanism, when the device is used as a pump, or with a driven mechanism, when the device is used as a motor. A portion of the shaft within the casing 15 is forked, as it were, the two members of the fork, 22', receiving between them a trunnion block 30 provided with oppositely-extending, aligning trunnions 30' of cylindrical form. A bolt 31, to which said trunnion block is secured by a pin 32 or otherwise, extends from one of the fork members 22' to the other, said bolt being mounted to rock in said fork members, bushings 33 being preferably used at these points, while similar bushings 34 fitted to turn on the trunnions 30', are locked, as at 35, to a so-called swashplate 36 which is inclined to the axis of the shaft 22, during the normal operation of the device. The bolt 31 is perpendicular to the axis of the trunnions 30', the axis of the bolt and that of the trunnions lying in the same normally inclined plane, which is the plane in which the swash-plate 36 rotates. With this swash-plate is held to rotate a race ring 37 in engagement with rollers 38 held in a cage or separator 39, and also in engagement with the inner surface of a ring or race 40 secured in a tilting box 41. The end thrust of the swashplate 36 is taken up by cylindrical rollers 42 engaging the plane rear surface of the ring 37, and located in suitable pockets of a separator 43. The outer ends of the rollers 42 are shown recessed (Fig. 9) to receive bearing balls 44 preventing endwise movement of these rollers and taking the end thrust due to centrifugal action. These balls are engaged on their sides, by the end plates 43' of the separator. It will be noted that each of the pockets of the separator holds a plurality of rollers 42, and the arrangement is varied in adjacent pockets, alternate pockets holding two and three rollers respectively, thereby avoiding the wearing of the opposing races or rings 37 and 45 on which the rollers 42 run, the ring 45 being secured to the tilting box 41. The edges of the different rollers 42, being staggered, or at different distances from the axis of the swashplate, will not track, but will engage the rings at different points or lines, thereby reducing wear as stated.—The same result might be obtained in other ways, for instance by the slightly different arrangement shown in Fig. 10, where instead of using a plurality of like rollers in each pocket, the rollers 42' contained in the same pocket are of different length, and their arrangement is reversed in adjacent pockets, that is to say, in one pocket the outer roller 42' will be the longer one, and in the next the inner roller will be the longer one.—The separator 43 is provided with a centering flange 43'' fitted loosely to the inner surface of the ring 45. The balls 44 are held in place by a cylindrical ring 46. The use of cylindrical rollers such as 42 or 42' is preferable to that of conical rollers hitherto employed at this point, since it avoids the tendency of the thrust exerted by the swashplate toward the ring 45, to crowd the rollers outwardly in the direction of their axes. At the same time, the new construction described herein is cheaper than the one formerly employed.

The swashplate 36 is provided with sockets in which are contained seating members 47 having surfaces of spherical curvature to engage ball-shaped ends 48 of connecting rods 49, the other ends of which, 50, are likewise ball-shaped and engage corresponding surfaces in pistons 51 arranged to reciprocate in the cylinders 17 of the barrel 16, it being understood that the swashplate 36 has as many sockets as there are cylinders 17. The ball ends 48, 50 are also engaged by split bushes 52, 53 respectively, the split character of which appears from Fig. 4, it being understood that the bushes 52, 53 are substantially alike. These bushes are held in position against the members 47 and 51 respectively, by nuts 54, 55 screwed into the sockets of the swashplate 36 and into the pistons 51 respectively, said nuts having heads or flanges 54', 55' respectively made with openings or notches (see lower portion of Fig. 4) to receive pins 56, 56' respectively or any other suitable device for locking the said nuts, after adjustment, to the swashplate and to the piston respectively. It will be noted that the ball end 48 is of the same size as the piston ball end 50 of the connecting rod 49; this not only provides an increased bearing surface between the connecting rod and the pistons 51, but is further advantageous in that it allows a higher oil pressure to be used. As in prior constructions of this type, the pistons 51 and the connecting rods, including their ball ends, are perforated to provide oil channels from the cylinders 17 to the sockets, for better lubrication, the seating members 47 having central recesses forming oil-pockets.

To adjust the inclination of the tilting box 41, which is particularly desirable when the device is used as a pump, I have provided the following arrangement, shown chiefly in Figs. 2 and 3: At one side of the shaft 22, the tilting box 41 is provided with a boss or socket 41' in which is secured one end of a pin 57, for instance by means of a rivet 58. The axis of this pin intersects the axis about which the tilting box is adjustable, the latter axis being perpendicular to the shaft 22 (in the particular position illustrated by Fig. 1, the axis of the tilting movement coincides with that of the bolt 31). In Figs. 2 and 3, the pin 57 is shown parallel with the shaft 22, as it will be when the tilting box is in the neutral position (plane of rotation of swashplate 36 perpendicular to shaft 22). As the tilting box is swung to change its inclination, the pin 57 will swing in a plane parallel to the shaft 22. The outer end of said pin has a sliding fit in a rocking member 59 having flat parallel side faces (Fig. 3) in engagement with corresponding flat faces on the inside of a sliding block 60 mounted to slide up and down in a chamber 61 formed in a casing 62. The chamber 61 is preferably cylindrical, and the outer surface of the slide block 60 is of like formation, see Fig. 3; to prevent the block from turning about its axis, a guide piece 63, in the nature of a vertical rib, may be secured to said block, as by pins 64, said rib engaging the walls of a groove 61' at one side of the cylinder 61. The upper and lower surfaces of the rocking member 59 form part of a cylindrical surface the axis of which is horizontal and perpendicular to the axis of the pin 57. The block 60 has a screw-threaded upward extension 65 in engagement with the internal threads on a sleeve 66 mounted to turn about a vertical axis, in the upper portion of the casing 62, said sleeve being held against longitudinal movement, as by a gland 67, locked by a nut 68. The sleeve 66 may be turned by means of a crank, key, or handle (not shown) applied to its upper end 66', so as to raise or lower the block 60 and the rocking member 59, thereby changing the inclination of the tilting box 41, and effecting a corresponding variation in the output of the device, if the latter is used as a pump, or a change in the number of revolutions, if the device is used as a motor. The block 60 may be provided with upper and lower grooves 60', for better lubrication, the upper of said grooves communicating with a passage 65' extending axially of the extension or shank 65.—It will be noted by reference to Fig. 2 that when the pin 57 is withdrawn from engagement with the rocking member 59, the latter can be turned about the axis of its cylindrical outer surface until the end surfaces of said member, which are vertical in Fig. 2, are approximately horizontal, and in this position the cylindrical outer surface of the rocking member is disengaged from the corresponding opposing cylindrical surface portions of the slide block 60. This enables the rocking member 59 to be readily inserted or removed when the pin 57 is not fitted into it, so that the parts can be assembled or taken apart without difficulty.

I claim as my invention:

1. A device of the type provided with a rotary barrel having therein cylinders arranged parallel to the axis of rotation of said barrel, pistons mounted for reciprocation in said cylinders, a shaft with which said barrel is held to turn, a swash plate mounted for rotation about an axis inclined to the axis of said barrel, connections between said swash plate and piston, and means for varying the inclination of said swash plate relatively to the axis of said barrel, characterized by said means consisting of an adjustable support in which said swash plate is rotatably mounted, said support being mounted for swinging movement about an axis extending transversely of and intersecting the axis of said barrel, a cylindrically curved member mounted to rock about an axis parallel to the axis of said support, an operative connection between said support and member, a slide block in which said member is journaled and means for operating said slide block to tilt said support and thereby adjust the inclination of said swash plate.

2. A device of the type provided with a rotary barrel having therein cylinders arranged parallel to the axis of rotation of said barrel, pistons mounted for reciprocation in said cylinders, a shaft with which said barrel is held to turn, a swash plate mounted for rotation about an axis inclined to the axis of said barrel, connections between said swash plate and pistons, and means for connecting said swash plate with said shaft, to rotate in unison therewith, while permitting rotation of said swash plate about its inclined axis, characterized by said means consisting of the provision of a fork upon said shaft, a block mounted within said fork, a cylindrical bolt passing through said block and fork for securing said block pivotally to said fork, the axis of said bolt extending perpendicular to and intersecting the axis of said shaft, said block being provided with a pair of trunnions, the axis of which extends perpendicularly to that of said bolt and said shaft, said trunnions being journaled in said swash plate and serving to connect said swash plate pivotally and directly to said block, and means to swing said swash plate upon said bolt as a pivot to adjust the inclination of said swash plate, comprising a non-rotary support in which said swash plate is rotatably mounted, a cylindrically curved member pivotally mounted to rock about an axis parallel to said bolt, a slide block in which said member is journaled, a connection between said member and said support and means for operating said slide block to adjust the inclination of said suport and swash plate.

In testimony whereof I have signed this specification.

JOHN ROBSON.